United States Patent [19]
Niculescu

[11] Patent Number: 6,085,613
[45] Date of Patent: Jul. 11, 2000

[54] CRANKSET WITH NO NEUTRAL POSITION

[76] Inventor: Florin Niculescu, Rue de la Gare 2, CH-2022 Bevaix, Switzerland

[21] Appl. No.: 09/077,318

[22] PCT Filed: Dec. 3, 1996

[86] PCT No.: PCT/CH96/00424

§ 371 Date: Jun. 4, 1998

§ 102(e) Date: Jun. 4, 1998

[87] PCT Pub. No.: WO97/20724

PCT Pub. Date: Jun. 12, 1997

[30] Foreign Application Priority Data

Dec. 7, 1995 [CH] Switzerland .............. 3456/95

[51] Int. Cl.[7] .............. B62K 21/12; B62K 21/14; B62M 1/02
[52] U.S. Cl. .............. 74/594.2; 74/594.1; 280/259
[58] Field of Search .............. 74/594.1, 594.4; 384/458, 538, 540, 545; 403/370, 371; 280/259; D12/123; D15/149

[56] References Cited

U.S. PATENT DOCUMENTS

| D. 178,422 | 7/1956 | Payberg et al. | D12/123 |
|---|---|---|---|
| 4,159,652 | 7/1979 | Trammell, Jr. | 74/117 |
| 4,373,760 | 2/1983 | Durham | 308/179.5 |
| 4,545,691 | 10/1985 | Kastan et al. | 384/458 |
| 4,772,252 | 9/1988 | Bona | 474/112 |
| 4,816,009 | 3/1989 | Philipp | 474/69 |
| 4,882,946 | 11/1989 | Beyl | 74/594.4 |
| 4,883,368 | 11/1989 | Stein | 384/458 |
| 5,067,370 | 11/1991 | Lemmens | 74/594.2 |
| 5,209,581 | 5/1993 | Nagano | 74/594.2 X |
| 5,281,003 | 1/1994 | Herman | 301/2.5 |
| 5,493,937 | 2/1996 | Edwards | 74/594.1 |
| 5,516,132 | 5/1996 | Simkins | 280/236 |
| 5,816,599 | 10/1998 | Soejima et al. | 280/259 |

FOREIGN PATENT DOCUMENTS

| 763 303 | 4/1934 | France . |
|---|---|---|
| 905 476 | 12/1945 | France . |
| 984 583 | 7/1951 | France . |
| 2 526 392 | 11/1983 | France . |
| 2 584 671 | 1/1987 | France . |
| 2 616 493 | 12/1988 | France . |
| 2 135 399 | 8/1984 | United Kingdom . |
| WO 86 05459 | 9/1986 | WIPO . |
| WO 95 19909 | 7/1995 | WIPO . |

OTHER PUBLICATIONS

International Cycle Show (New York), NBDA/WEST (San Diego), American Bicyclist & Motorcyclist Magazine, p. 60, Apr. 1977.

*Primary Examiner*—Vinh T. Luong
*Attorney, Agent, or Firm*—Griffin, Butler, Whisenhunt & Szipl, LLP

[57] ABSTRACT

The crankset for the driving of bicycles and other vehicles or machines by muscular force includes two coaxial crank spindles (8, 9), mounted in a bottom bracket tube and each provided with a radial arm (20, 22) beside one or more toothed chain rings driving a chain transmission. The chain ring carrier (15) has an axis (25) offset forwards with respect to the spindles and it is coupled to each radial arm by an articulated connecting rod. Sealing gaskets (42, 46, 53) are placed within the bottom bracket tube (2) and between both spindles to protect the spindle bearings (41, 45, 48, 51) as regards the exterior. The chain ring carrier (15) is mounted by sealed roller bearings (27) on an adjustable eccentric member (26) to adjust the direction of eccentricity. The two articulations (34) of the connecting rods on the chain ring carrier can be situated substantially facing the respective cranks (11, 13).

10 Claims, 5 Drawing Sheets

CRANKSET WITH NO NEUTRAL POSITION

FIELD OF THE INVENTION

The present invention concerns a crankset without a dead centre position, in particular for a bicycle, including: a fixed bottom bracket tube, a hollow outer spindle rotatably mounted about a first axis by first bearings in the bottom bracket tube and attached to a first crank, an inner spindle rotatably mounted by second bearings coaxially in the outer spindle and attached to a second crank, sealing means for assuring sealed protection of the bearings as regards the exterior of the crankset, an output member rotatably mounted about a second axis parallel to and offset with respect to the first axis on an eccentric member fixed to the bottom bracket tube, the output member being intended for driving a mechanical transmission, and two articulated linkages connecting the output member respectively to each crank or to each spindle.

The invention applies in particular to bicycle cranksets, but also to any other use of a crankset driven by muscular force, for example for propelling any vehicle or for activating a machine, a ventilator, an electric generator, etc.

BACKGROUND OF THE INVENTION

In a conventional crankset, the vertical position of the cranks in a same radial plane constitutes a dead centre position, because the weight of the person pedalling cannot produce a torque on either of the two cranks in this position. In order to overcome this drawback, it has been proposed for more than 60 years to put the toothed chain ring, which drives a bicycle chain, forwards in an offcentre position, to separate the cranks from each other and from the chain ring in order to allow them mutual angular play, and to connect each crank or the spindle thereof to the chain ring by an articulated linkage able to absorb the radial movements due to the eccentricity. FR Patent Nos. 763,303, 905,476, 984,583, 2,526,392 and 2,584,671, and U.S. Pat. Nos. 4,159,652, 4,772,252, 4,816,009 and 5,067,370 disclose such cranksets without a dead centre position. Patent application WO 95/19909 also discloses such a crankset, further including an oscillating support which carries the crank spindles to allow the eccentricity value to be modified between zero and discreet different values, when it is moved by means of a control lever.

However, none of these cranksets has made any commercial impact, probably because of manufacturing problems and problems of water and dirt resistance, since sealing is difficult to assure because of the multiplicity of moving parts.

For conventional gear and crank apparatus with a single spindle, known examples of annular sealing gaskets are illustrated in GB Patent No. 2 135 399 and FR Patent No. 2 616 493.

In a crankset of the kind indicated in the preamble, disclosed in Patent application WO 86/05459, each of the two articulated linkages between the corresponding spindle and the chain ring acting as output member includes a radial arm made integrally with the spindle and oriented in the same direction as the corresponding crank. In order to transmit an approximately tangential force and thus a torque to the chain ring, the linkage includes either a roller carried by the chain ring and engaged in a radial slide of the arm, or an oscillating disc housed in the arm and provided with an eccentric pin engaged in the chain ring. This articulated mechanism is protected, on the outer side of the chain ring, by a circular housing fixed to the chain ring, having a frontal flange provided with a central opening for allowing the inner spindle carrying the crank on that side to pass. This opening is large enough to allow the oscillating rotating movement of the housing with respect to the spindle, because of the eccentricity; it is obturated internally by a flange integrated with the spindle, a sealing gasket in the shape of an annular disc being placed between the two flanges so as to slide onto one of them. A portion of the sliding surface on this flange is thus sometimes covered by the gasket and sometimes exposed to the open air. Dirt which reaches this surface can thus be introduced into the joint, rapidly deteriorate the sealing, reach the bearings and damage them, which has led to marketing of this type of crankset being abandoned. The latter also had the drawback of the transverse space requirement of the housing containing the two radial arms between the chain ring and the corresponding crank, requiring the other crank also to be moved away to maintain the symmetry with respect to the median plane of the bicycle.

SUMMARY OF THE INVENTION

The present invention concerns a crankset capable of avoiding the aforementioned drawbacks, while assuring durable sealing of the spindle bearings, which are generally rolling bearings, and allowing compact and light construction. An additional object is to arrange the articulated linkage in a simple, efficient form resisting external ambient conditions. Another additional object is to arrange the articulated linkage so as to obtain optimum transmission of the driving torque to the output member when such driving torque is at maximum, i.e. when the descending crank is approximately horizontal.

Generally, the invention concerns a crankset of the type indicated in the preamble, characterized in that the sealing means include first sealing means, disposed around the outer spindle in the bottom bracket tube and protecting the first bearings as regards the exterior of said tube, and second sealing means, disposed in the outer spindle and protecting the second bearings as regards the exterior of said spindle.

Thus the rolling bearings of the crank spindles, which are the elements most sensitive to dirt, can be protected by sealing gaskets situated entirely within the bottom bracket tube, radially between coaxial parts one of which can rotate with respect to the other, in particular between cylindrical surfaces of these parts. These gaskets may be of a known and well tested type, occupying little space and providing satisfaction in conventional cranksets. There is no need for an external housing, each articulation of the articulated linkages being easily able to be realized by a sealed bearing, available on the market.

Preferably, the second sealing means include an annular sealing gasket, which obturates an annular gap between the outer spindle and the inner spindle on the side of the second crank, and closing means which obturate in a sealed manner a central bore of the outer spindle on the side of the first crank. These closing means may be formed for example by a sealing plug, or by the bottom of said bore if the latter is blind.

In a particularly advantageous embodiment of a crankset according to the invention, each of said articulated linkages includes a connecting rod having one end connected to the output member by a first articulation, the other end of said connecting rod is connected to the corresponding spindle or to the corresponding crank by a second articulation, and said first articulation is situated in proximity to a radial plane passing through the first and second axis when the corresponding crank is in a descending horizontal position. This results in facilitated construction and improved efficiency of the crankset.

BRIEF DESCRIPTION OF THE DRAWINGS

Other features and advantages of the invention will appear in the following description of a preferred embodiment of a bicycle crankset, given by way of example with reference to the annexed drawings, in which.

DESCRIPTION OF PREFERRED EMBODIMENTS

Figure 1:
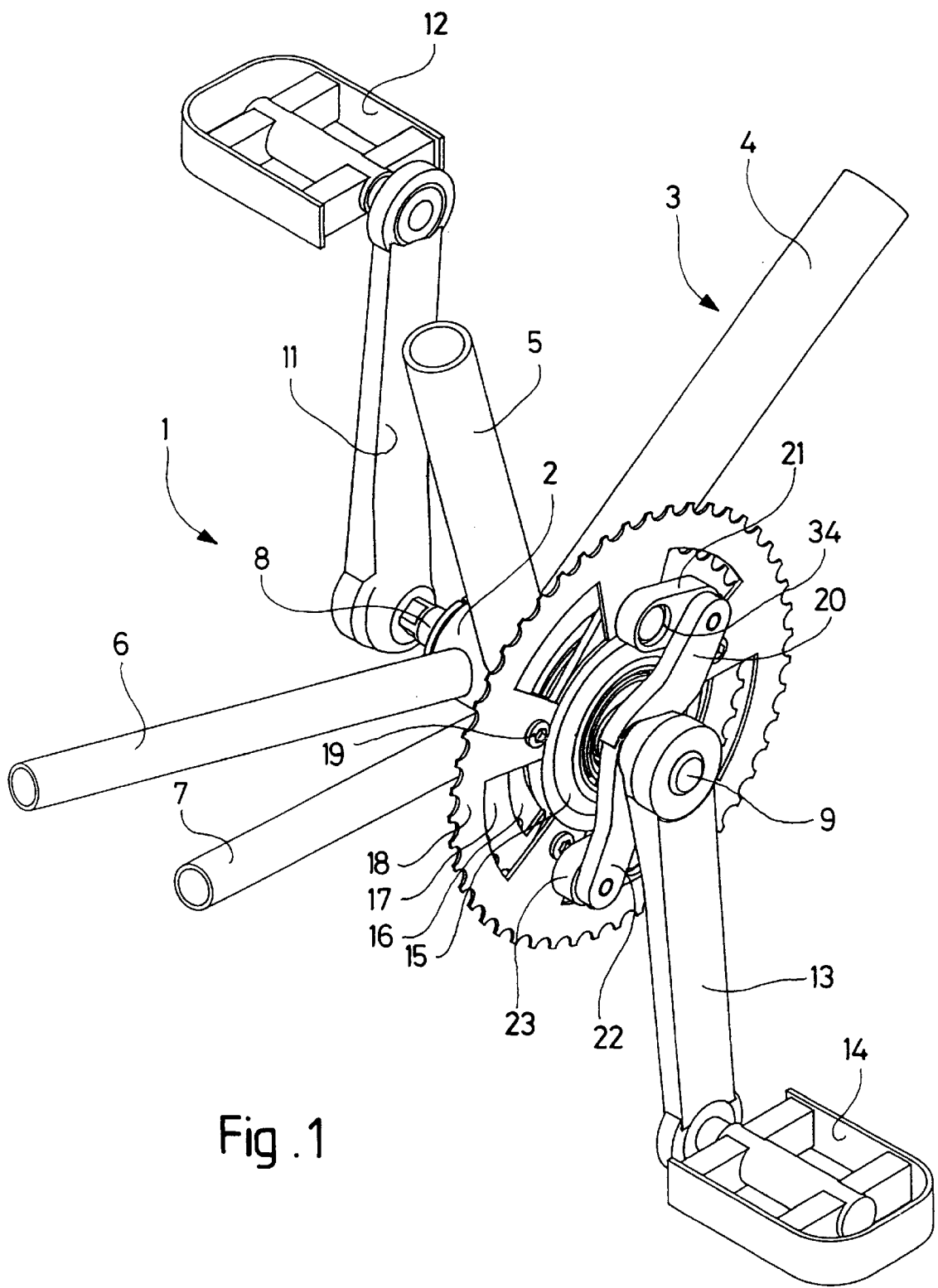
FIG. 1 is a perspective view of the bicycle crankset according to the invention.
Figure 2:
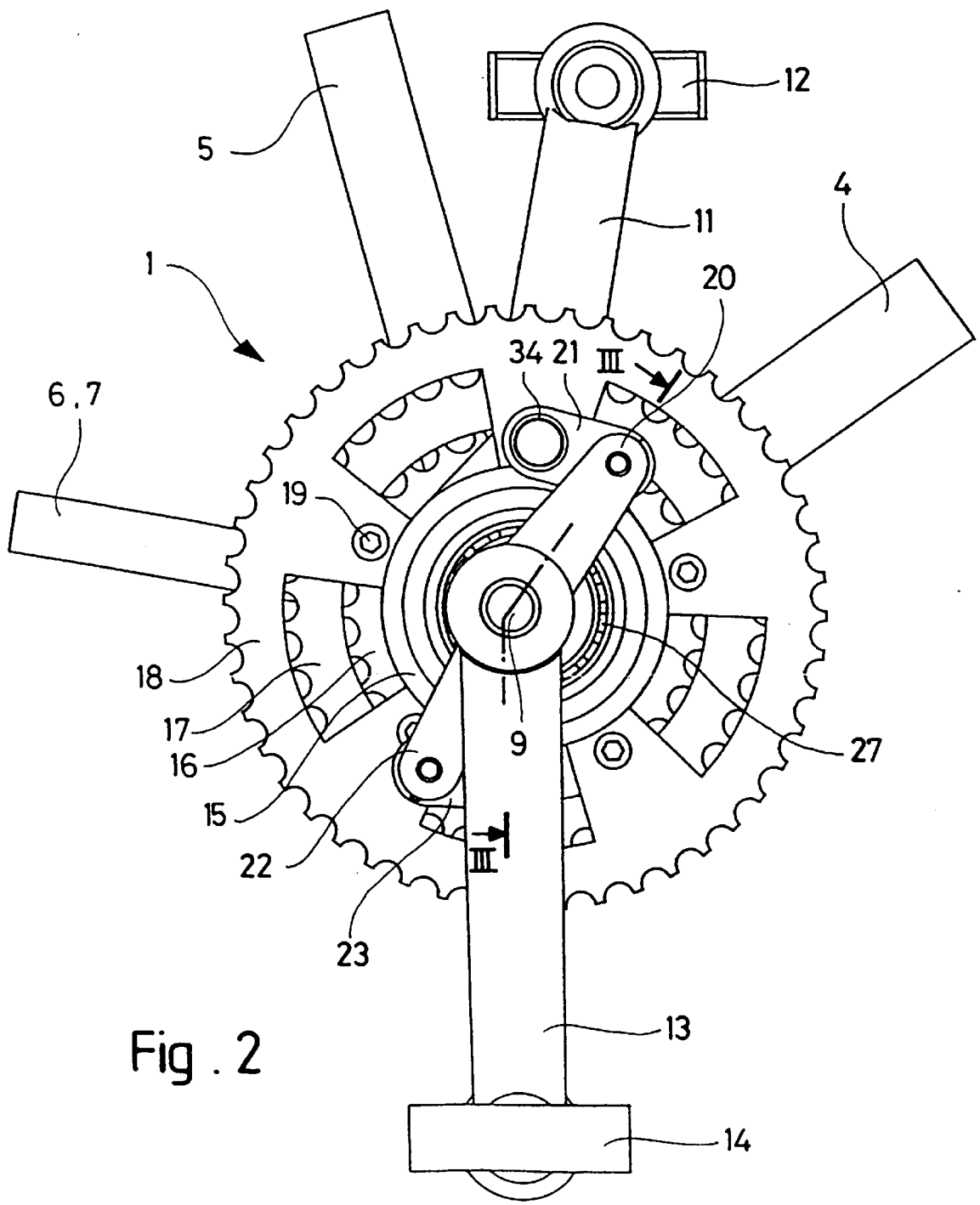
FIG. 2 is a lateral elevation view of the crankset.
Figure 3:
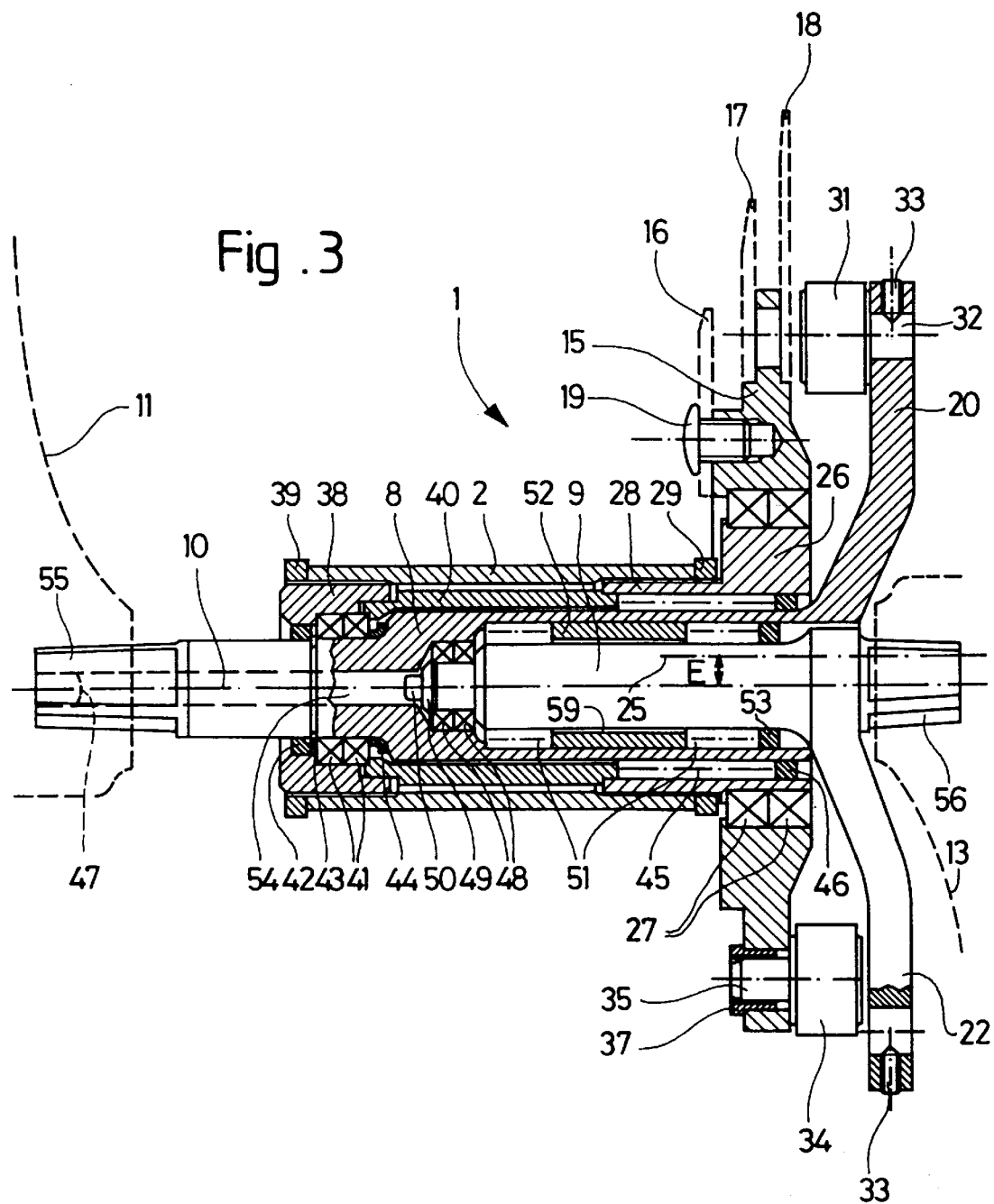
FIG. 3 is a cross-sectional view of the crankset along line III—III of FIG. 2.

With reference to FIGS. 1 to 3, crankset 1 includes a bottom bracket tube 2 which is incorporated in a bicycle frame 3, this frame including tubes 4, 5, 6 and 7, one end of each tube being welded to tube 2. An outer spindle 8 and an inner spindle 9 are rotatably and coaxially mounted in tube 2 so as to rotate about a first axis 10. A left crank 11 provided with a pedal 12 is removably fixed onto outer spindle 8, and a right crank 13 provided with a pedal 14 is removably fixed onto inner spindle 9. On the right side of the bicycle, crankset 1 includes a chain ring carrier 15 on which, in a conventional manner, are mounted for example three removable toothed chain rings 16, 27 and 18 for driving the back wheel of the bicycle by a chain transmission. The chain rings are fixed by means of screws 19. In a radial plane situated between chain ring carrier 15 and right crank 13, outer spindle 8 has a radial arm 20 whose free end is connected to the chain ring carrier by an articulated connecting rod 21. Likewise, inner spindle 9 has a radial arm 22 whose free end is connected to the chain ring carrier by an articulated connecting rod 23. Arms 20 and 22 extend in approximately opposite respective directions, but oscillating angularly with respect to each other during rotation of the crankset, as do the cranks.

In FIGS. 2 and 3, it will be noted that chain ring carrier 15 is mounted in an eccentric manner with respect to crank spindles 8 and 9, its axis of rotation 25 having an eccentricity E with respect to axis 10 of the spindles. Chain ring carrier 15 is mounted on a stationary eccentric member 26 by means of a pair of ball bearings 27 centred on axis 25. Eccentric member 26 has a cylindrical end portion 28 centred on axis 10 and provided with an outer threading allowing it to be screwed into a corresponding threading of bottom bracket tube 2. End portion 28 also carries a lock-nut 29 which is blocked by screwing against tube 2 to block the angular position of eccentric member 26. Thus, by unscrewing lock-nut 29, it is possible to cause eccentric member 26 to rotate to orient eccentricity E in any desired direction. This direction is horizontal forwards in the example shown. Consequently, in a known manner, when one of cranks 11, 13 is situated in the vertical plane passing through axis 10, i.e. at its dead centre position, the other crank is situated forward of this plane and can produce torque, as will be explained with reference to FIG. 4.

In FIG. 3, connecting rods 21 and 23 are not shown, in order to clarify the drawing and let the construction of their articulations appear. The articulation of each connecting rod 21, 23 on the corresponding arm 20, 21 is achieved by a sealed rotating roller 31 whose spindle 32 is fixed in the arm by means of a blocking screw 33. Roller 31 is driven into a corresponding orifice of the connecting rod. Articulation of each connecting rod onto chain ring carrier 15 is achieved by another sealed rotating roller 34 whose spindle 35 is threaded and held in an orifice of the chain ring carrier by means of a threaded socket 36. Rollers 31 and 34 may be for example of the type KR19C.DZ by FAG GmbH of Schweninfurt, Germany. The two connecting rods 21 and 23 have the same dimensions, and their articulations formed by the two rollers 34 onto chain ring carrier 15 are diametrically opposite with respect to axis 25.

FIG. 3 also shows the construction within bottom bracket tube 2, which is threaded internally at its two ends for accommodating respectively eccentric member 26 on the right and, on the left, a externally threaded socket 38 capable of being blocked by means a lock-nut 39 similar to lock-nut 29. Socket 38 has three inner bearing surfaces of stepped diameters for centring respectively a first tubular spacer 40, one or two ball bearings 41 carrying outer spindle 8, and an annular sealing gasket 42 of the same type as those used in conventional bicycle cranksets. Spindle 8 is fixed axially onto bearings 41 by means of a circlip 43 and a washer 44 held between the inner ring of one of bearings 41 and a shoulder of the spindle. The outer ring of the same bearing 41 abuts axially against the first spacer 40, whose other end abuts against end portion 28 of eccentric member 26. On the right, outer spindle 8 is supported in eccentric member 26 by another bearing, formed by a needle roller bearing 45 obturated externally by an annular sealing gasket 46 similar to gasket 42.

A central bore 54 passing through the entire length of hollow outer spindle 8 has three successive stepped diameters the smallest of which, opening out on the side of first crank 11, forms an access hole allowing passage of a screwdriver. When in service, this hole is obturated by a removable sealing plug 47. The rest of bore 54 contains inner spindle 9 and its bearings. These latter include on the one hand, one or two ball bearings 48 whose inner rings are blocked on one end of inner spindle 9 by gripping by means of an inner washer 49 and a screw 50, and on the other hand, two needle roller bearings 51 separated by a second spacer 52 and protected from the outside by an annular sealing gasket 53 obturating the radial gap 59 between the two spindles.

However, it will be noted that the rotatable assembly of inner spindle 9 in outer spindle 8 could be achieved in a different way. For example, bore 54 of spindle 8 could be blind, so that the spindle itself constitutes a sealed closure of this bore on the side of first crank 11. In order to block the bearings axially between the two spindles, screw 50 could pass through inner spindle 9, or the left end of spindle 9 could have a radial flange against which the bearings are pressed by means of a ring placed to the right of these bearings and pushed against them by right crank 13 when it is fixed onto its spindle. Moreover, it will be noted that the number and the type of roller bearings 48 and 51 can be different to that which is described hereinbefore.

Thus, the two spindles 8 and 9 are mounted in a perfectly rigid manner within bottom bracket tube 2, whereas sealing of their bearings is entirely assured by the closure of bore 54 on the left and by annular sealing gaskets 42, 46 and 53 radially gripped between two coaxial cylindrical surfaces.

These gaskets have relatively small diameters and are well protected in the bottom bracket tube, which assures a long lifetime.

Furthermore, the construction described hereinbefore allows the crankset to be assembled in advance, outside tube 2, then mounted as a block in said tube. Assembly is effected as follows:

- each roller 31 is driven into the corresponding connecting rod 21, 23.
- spindle 32 of each roller 31 is engaged into the corresponding arm 20, 22 and blocked by means of screw 33.
- two roller bearings 27 are driven into eccentric member 26.
- chain ring carrier 15 is driven into roller bearings 27.
- large chain ring 18 and middle chain ring 17 are fixed onto chain ring carrier 15.
- the two rollers 34 are fixed onto chain ring carrier 15.
- small chain ring 16 is fixed onto chain ring carrier 15.
- washer 49 is introduced into outer spindle 8, then the two roller bearings 48 are driven in.
- the first needle roller bearing 51 is driven in, spacer 52 is inserted, the other needle roller bearing 51 is driven in, then sealing gasket 53.
- outer spindle 8 is held vertically and screw 50 is introduced placed on a screwdriver in hole 54.
- inner spindle 9 is introduced in outer spindle 8. Screw 50 is tightened quite hard and plug 47 is put in place.
- spacer 40 is introduced into eccentric member 26, then needle roller bearing 45 is driven into the eccentric member until it touches the spacer. Sealing gasket 46 is also driven in. Spacer 40 is removed again.
- lock-nut 29 is screwed against eccentric member 26.
- the two spindles are introduced into eccentric member 26.
- spacer 40 is introduced into eccentric member 26.
- washer 44 is placed on outer spindle 8, the width thereof having been previously adjusted, then roller bearings 41 and circlip 43.
- the assembly is screwed into bottom bracket tube 2.
- the assembly is unscrewed until eccentricity E of eccentric member 26 is directed in the desired position, for example horizontally forwards.
- lock-nut 29 is unscrewed to block eccentric member 26 on tube 2.
- sealing gasket 42 is introduced into socket 38.
- socket 38 is screwed into tube 2 and tightened quite hard.
- the chain is put on one of chain rings 16 to 18.
- the pedals are mounted on cranks 11 and 13.
- cranks 11 and 13 are mounted on the profiled heads 55 and 56 of spindles 8 and 9.

A particularly advantageous feature of crankset 1 consists in that the two diametrically opposite rollers 34, forming the articulations of connecting rods 21, 23 on chain ring carrier 15, are each disposed substantially facing the corresponding crank 11, 13. This means that each radial arm 20, 22 is offset angularly with respect to the corresponding crank, by an angle which is determined by the lengths of the connecting rod and the arm. This offsetting is preferably forwards in the normal rotational direction of the crankset, in order to exert traction on the connecting rod, but it could also be in the other direction. The advantage of this position of the anchorage points on the chain ring carrier is that, when the crank is directed forwards and thus produces the greatest driving torque, the direction of the connecting rod is approximately perpendicular to the direction of eccentricity E, which allows the maximum torque to be transmitted in an optimum manner to the chain ring carrier, as will be seen hereinafter. This advantage is largely preserved if the eccentricity is given a direction other than horizontal, as long as it is directed forwards.

Figure 4:
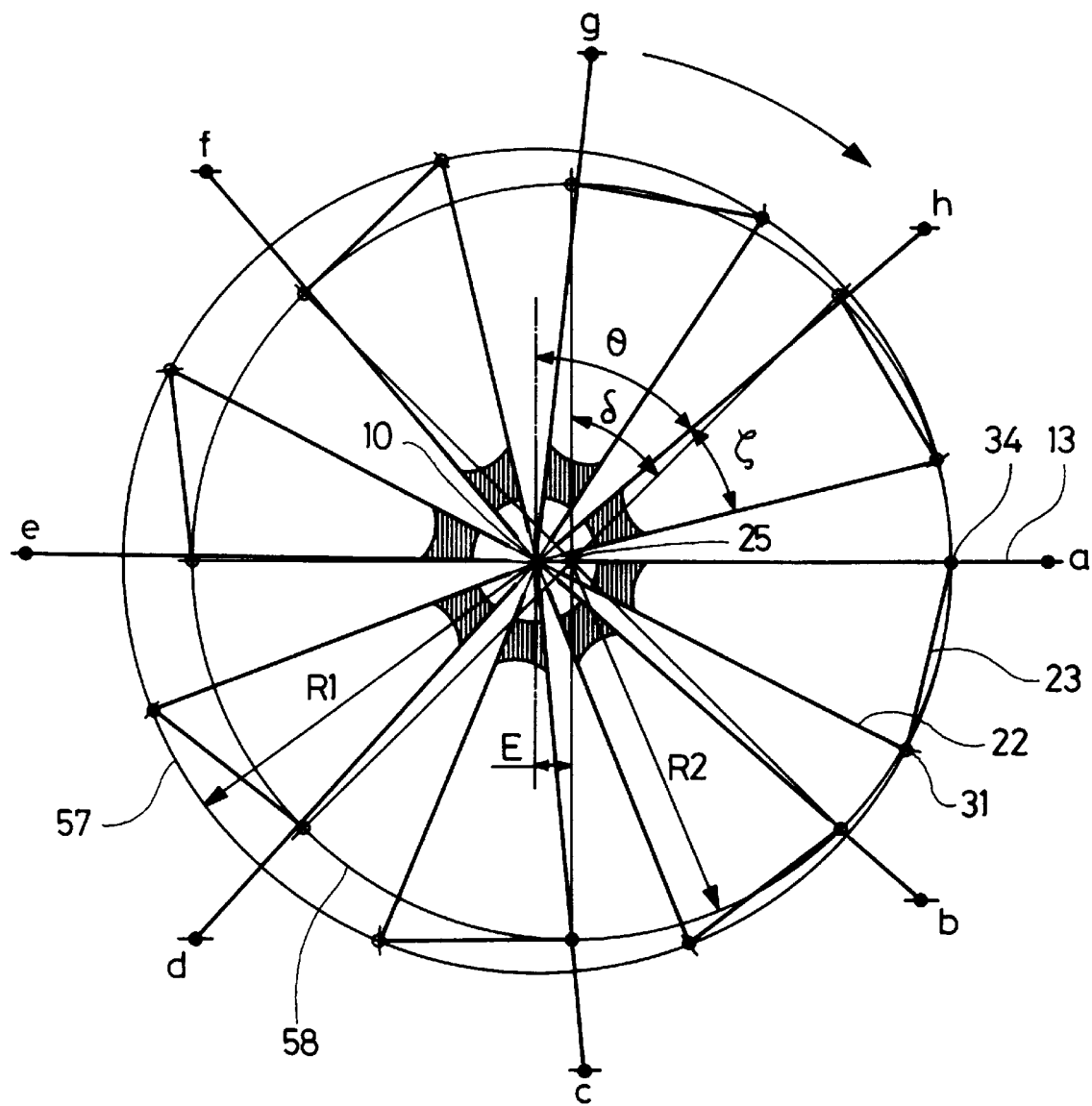
FIG. 4 is an elevation diagram showing eight successive positions of the cranks of the crankset.

FIG. 4 shows eight successive positions a–h of right crank 13, with its radial arm 22, its connecting rod 23 and rollers 31 and 34 forming the articulations of the connecting rod, for eight successive positions spaced at 45° from chain ring carrier 15. If one assumes that the bicycle travels at a constant speed and the angular velocity of the chain ring carrier is thus constant, the eight positions are regularly spaced in time. In FIG. 4, the angles of rotation $\delta$ of the chain ring carrier and $\theta$ of the crank have their origin in the vertical line passing through the corresponding axis of rotation 25, 10. The Figure shows the following dimensions:

| | |
|---|---|
| Length of each arm 20, 22 | $R_1$ = 60 mm |
| Radius of anchorage point 34 on the chain ring carrier | $R_2$ = 55 mm |
| Eccentricity (horizontal) | E = 5 mm |
| Length of each connecting rod 21, 23 | B = 28 mm |
| Arm-crank offset | $\zeta$ = 27° |

It will be noted that $E=R_1-R_2$, so that the two corresponding circles 57 and 58 are tangent. As a result, in the proximity of position a, where the crank is directed forwards and produces the maximum torque, the connecting rod is substantially perpendicular to the radius of the two circles and thus transmits the torque in an optimum manner, with minimum radial stresses.

The opposite positions a–e, b–f, c–g and d–h show simultaneous respective positions of the two cranks. The angle between the two cranks is maximum in the position c–g close to the vertical, thus perpendicular to the direction of eccentricity E, which removes the dead centre position in a known manner. During the rising trajectory of each crank, corresponding to positions d, e and f, connecting rod 23 is not perpendicular to radii $R_1$ and $R_2$, but this is not important since it does not then transmit any significant effort. Conversely, the connecting rod is substantially perpendicular to the radii in the descending trajectory of the crank (positions g, h, a and b), which allows the direction of eccentricity to be modified by pivoting eccentric member 26, for example for adapting the gear crank to the morphology of the cyclist or to his personal position on the bicycle, without affecting the crankset performance.

FIG. 4 also shows that the arrangement of rollers 34, i.e. the anchorage points of connecting rods 21 and 23 on chain ring carrier 15 facing each crank 11 and 13, may be changed under certain conditions while maintaining the same kinematic and dynamic advantages. From the diagram of FIG. 4, let us assume that crank 13 is mounted in another orientation on its spindle 9, which means selecting another value for angle $\xi$ between the crank and the corresponding radial arm 22. For example, let us assume that in position a of the mechanism, horizontal crank 13 is dismantled and remounted vertically upwards, by acting also symmetrically with the other crank, this means adding 90° to $\xi$ and removing 90° from $\theta$ without changing any of the other parameters. The change in $\theta$ changes the direction of application of forces by the cyclist with respect to the crankset. It is thus sufficient to pivot the crankset by 90° forwards in its tube 2 about axis 10 in order to re-establish the kinematic and dynamic conditions of FIG. 4. Eccentricity E then becomes vertical downwards, axis 25 being placed below axis 10. The general condition relative to the preferred position of the articulations formed by rollers 34 is thus that, when the crank is situated in a horizontal forwards position, articulation 34 of the corresponding connecting rod on chain ring carrier 15 must be in proximity to the radial plane passing through the two axes 10 and 25, thus in the same general direction as eccentricity E. An advantage of this arrangement is that right crank 13 can easily be placed in the same radial plane as the two arms 20 and 22, resulting in a gain in the width of the crankset and the spacing between the two pedals.

Figure 5:
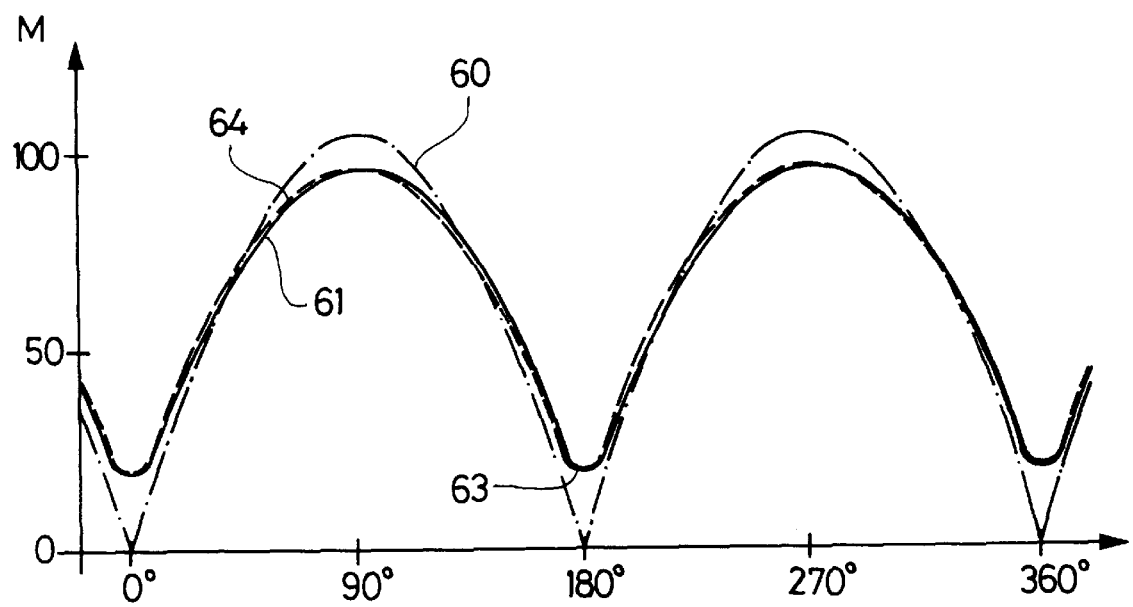
FIG. 5 shows the evolution of the torque transmitted to the toothed chain rings over one revolution of the crankset, when the cyclist exerts solely a vertical descending force on the pedals.

FIG. 5 shows the torque M applied to chain ring carrier 15 as a function of the angle of rotation δ thereof, assuming that the cyclist exerts solely a descending vertical force of 600 N on the descending crank, the cranks having a standard length of 175 mm. Curve 60 represents the torque in a conventional crankset, wherein the two cranks are attached to the chain ring carrier. Curve 61 represents the torque in crankset 1 according to the invention, in the arrangement of FIG. 4, i.e. with eccentricity E horizontal forwards. This curve is flatter than curve 60, i.e. the torque is more uniform over one revolution of the crankset. The minimum torque 63, in the dead centre zone where torque 60 of the conventional crankset falls to zero, represents approximately 20% of the maximum torque. In practice, one knows that the minimum torque will often be slightly higher, because a skilled cyclist nonetheless applies certain horizontal or rising forces to the pedals.

Curve 64 represents the torque in crankset 1 when eccentricity E is directed forwards at 30° above the horizontal. It will be noted that it is very close to curve 61 and has the same maximum and minimum values, i.e. such a pivot of eccentric member 26 does not affect the crankset performance when the forces applied to the pedals are vertical. Conversely, it allows the crankset kinematics to be adapted, in particular the position of the zone in which the cranks are offset, to the morphology of the cyclist and his position on the bicycle.

Figure 6:
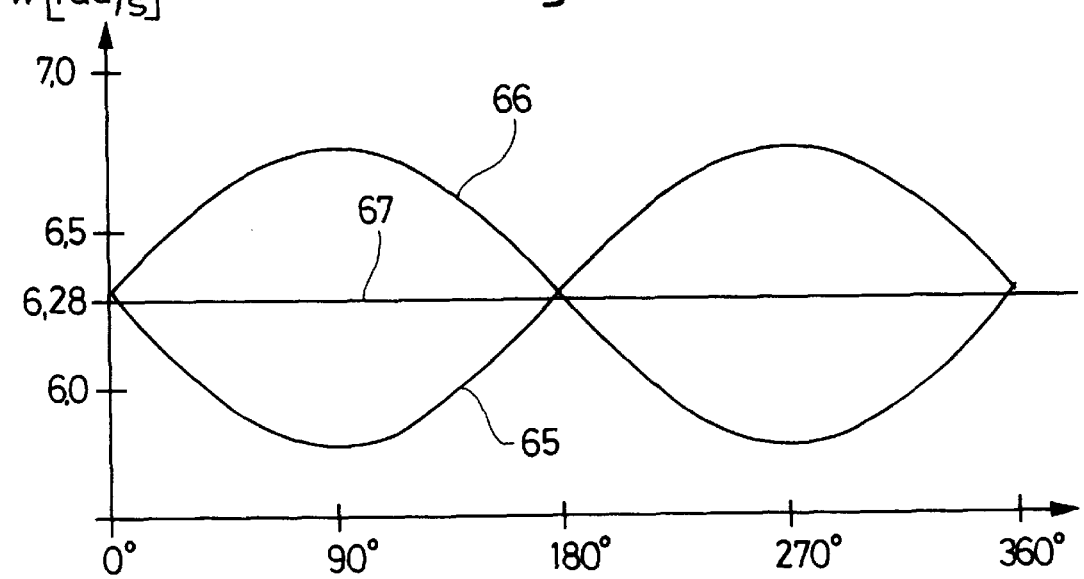
FIG. 6 shows the evolution of the rotational speed of each crank over one revolution of the crankset, for a constant speed of the toothed chain rings.

The diagram of FIG. 6 shows the evolution of the angular velocity ω of the cranks as a function of angle θ of right crank 13 for a constant speed of chain ring carrier 15 (1 revolution per second) and thus of the bicycle, when eccentricity E is in a horizontal direction, thus in the conditions of curve 61 of FIG. 5. Curve 65 concerns right crank 13 and curve 66 concerns left crank 11. The straight line 67 represents the velocity of chain ring carrier 15.

It will be noted that each crank rotates more slowly when it descends, and more quickly when it rises. The speed of each crank varies progressively, smoothly, and the minimum speed represents approximately 86% of the maximum speed. This is important for the cyclist's comfort and facilitates endurance by avoiding imposing substantial accelerations and decelerations on his legs.

In light of the preceding description, those skilled in the art will understand that the invention allows a crankset to be provided which is perfectly protected against external conditions, in particular, water and dirt, without using bulky accessories such as an external housing. Moreover, the crankset can be completely assembled prior to introduction into the bottom bracket tube, which guarantees secure and easy assembly and also facilitates any disassembly. The offset position of arms 20 and 22 with respect to the cranks, contrary to the prior art according to FR Patent No. 2 584 671 wherein such arms are situated facing the cranks, allows advantageous kinematics and optimum transmission of the torque from the cranks to the chain rings, without increasing the dimensions and weight of the construction. If necessary, this arrangement also allows the right crank and the arm associated therewith to be made in a single part, thereby allowing a substantial gain in the total width of the crankset. This arm is not then necessarily radial and can, in particular, extend in a circumferential direction from the crank.

I claim:

1. A crankset without a dead center position, including:

a fixed bottom bracket tube;

a hollow outer spindle rotatably mounted about a first axis by first bearings in said bottom bracket tube and attached to a first crank;

an inner spindle rotatably mounted by second bearings coaxially in said outer spindle and attached to a second crank;

sealing means for assuring sealed protection of said bearings as regards an exterior of said crankset;

an output member rotatably mounted about a second axis parallel to and offset with respect to said first axis on an eccentric member fixed to said bottom bracket tube, said output member being intended for driving a mechanical transmission; and a first articulated linkage connecting said output member to one of the first crank and the outer spindle, and a second articulated linkage connecting said output member to one of the second crank and the inner spindle, wherein said sealing means include first sealing means, disposed around said outer spindle in said bottom bracket tube and protecting said first bearings as regards an exterior of said tube, and second sealing means, disposed in said outer spindle and protecting said second bearings as regards an exterior of said spindle, and wherein said second sealing means include an annular sealing gasket, which obturates an annular gap between said outer spindle and said inner spindle on the side of said second crank, and closing means which obturate in a sealed manner a central bore of said outer spindle on the side of said first crank.

2. A crankset according to claim 1, wherein said eccentric member is adjustable by pivoting about said first axis to adjust the direction of its eccentricity.

3. A crankset according to claim 2, wherein said eccentric member is screwed into said bottom bracket tube and carries a lock-nut arranged for blocking it against said tube.

4. A crankset according to claim 1, wherein each of said articulated linkages includes a connecting rod having one end connected to an output member by a first articulation, the other end of said connecting rod being connected to one of the corresponding spindle and the corresponding crank by a second articulation, and wherein said first articulation is situated in proximity to a radial plane passing through said first and second axis when the corresponding crank is in a descending horizontal position.

5. A crankset according to claim 4, wherein said first articulation is situated substantially facing the corresponding crank.

6. A crankset according to claim 5, wherein each spindle is provided with a respective radial arm disposed on the exterior facing said output member and carrying said second articulation, said arm being offset angularly with respect to the corresponding crank.

7. A crankset according to claim 4, wherein each spindle is provided with a respective radial arm disposed on the exterior facing said output member and carrying said second articulation, said arm being offset angularly with respect to the corresponding crank.

8. A crankset according to claim 7, wherein each crank is removably mounted on the corresponding spindle.

9. A crankset according to claim 4, wherein, in a vertical plane view, circles representing the trajectories of said first and second articulation of each connecting rod are tangent.

10. A crankset according to claim 1, wherein said output member is a chain ring carrier on which one or more toothed chain rings are removably mounted.

* * * * *